US007347899B2

(12) United States Patent
Day

(10) Patent No.: US 7,347,899 B2
(45) Date of Patent: Mar. 25, 2008

(54) DECORATOR TEMPERATURE CONTROL SYSTEM

(76) Inventor: Benjamin F. Day, 3310 122nd St., Pleasant Prairie, WI (US) 53158-4235

( * ) Notice: Subject to any disclaimer, the term of this patent is extended or adjusted under 35 U.S.C. 154(b) by 0 days.

(21) Appl. No.: 11/400,355

(22) Filed: Apr. 7, 2006

(65) Prior Publication Data

US 2007/0234909 A1 Oct. 11, 2007

(51) Int. Cl.

*B05C 11/00* (2006.01)
*B41F 23/04* (2006.01)
*B41F 31/00* (2006.01)
*G05D 23/13* (2006.01)

(52) U.S. Cl. ......................... 118/667; 118/46; 101/487; 101/350.1; 236/12.1

(58) Field of Classification Search ................ 118/667, 118/46, 203, 249; 101/487, 350.1, 216, 350.3; 236/12.1

See application file for complete search history.

(56) References Cited

U.S. PATENT DOCUMENTS 3,223,028 A 12/1965 Brigham
3,766,851 A 10/1973 Sirvet et al.
4,921,093 A 5/1990 Peters et al.
5,107,790 A * 4/1992 Sliker et al. ................ 118/674
5,189,960 A * 3/1993 Valentini et al. ............ 101/487
5,572,927 A 11/1996 Sirvet
5,603,261 A * 2/1997 Buenz ........................ 101/216
5,609,100 A 3/1997 Williams
6,178,886 B1 1/2001 Williams et al.
6,367,380 B1 4/2002 Whelan
6,651,522 B2 11/2003 Didonato
6,920,822 B2 7/2005 Finan

* cited by examiner

*Primary Examiner*—Chen Wen Jiang
(74) *Attorney, Agent, or Firm*—Foley & Lardner LLP

(57) ABSTRACT

A decorator temperature control system includes a recirculation loop configured to recirculate a solution and a feeder line configured to receive the solution from the recirculation loop and deliver the solution to at least one ink roller on a decorator. A feed valve is located between the recirculation loop and the feeder line and proximate the decorator and is configured to control the flow of the solution from the recirculation loop to the feeder line. The valve is controlled from a location remote from the decorator.

27 Claims, 6 Drawing Sheets

DECORATOR TEMPERATURE CONTROL SYSTEM

FIELD OF THE INVENTION

The present invention relates generally to the field of decorators used to apply ink to objects, and more specifically, to a system and method for controlling the temperature of ink used in a decorator.

BACKGROUND OF THE INVENTION

Cans or other cylindrical containers are often decorated using machines known as decorators. Decorators typically apply a multi-color ink pattern, or print image, to a can by rotating the can past a printing blanket loaded with ink. Decorators often operate at high speeds, commonly processing over 2000 cans per minute.

Conventionally, a decorator consists of a mandrel wheel having a number of mandrels arranged along the peripheral of the mandrel wheel. Each mandrel is configured to support an individual can, and cans continuously rotate about the axis of the mandrel wheel. Simultaneously, a blanket wheel turns in coordination with the mandrel wheel. The blanket wheel typically has a number of printing blankets arranged around the peripheral of the blanket wheel. Each printing blanket rotates past one or more inkers, each inker applying a different color ink for the final print image.

After rotating past the inkers, the printing blanket rotates past and contacts a can, imprinting the decoration upon the can. The can is then directed to varnishing and curing machines, and the printing blanket continues to rotate with the blanket wheel and repeats the process.

In order to properly supply the printing blankets with ink from the various inkers, each inker contains a number of rollers that act in coordination with each other to transfer ink from an ink tray or ink fountain to the printing blanket on the blanket wheel. A fountain wheel picks up ink from the ink tray and the ink subsequently passes over a series of rollers, including a number of inker rollers, that may oscillate axially in addition to rotating about their individual axes. Eventually, the ink is transferred to a printing plate cylinder, which in turn transfers the image to the printing blanket.

In order to process cans at relatively high speeds (e.g., 2000 or more cans per minute), it is necessary for the rollers to be rotating at high speeds to constantly keep the rotating printing blankets supplied with ink.

One challenge associated with using decorators at such high speeds is maintaining the ink at the proper temperature. In order for the ink to be properly applied to a can, it must be held at a substantially constant temperature (e.g., 90° F.). If the temperature varies too far up (e.g., with high machine speeds) or down (e.g., with low machine speeds or during start-up), the ink image will be spoiled and the printed can will end up being scrapped. This reduces the efficiency of the manufacturing process and increases production costs. Ideally, the temperature of the ink should be maintained at the appropriate level so as to avoid spoilage of printed cans.

Another challenge associated with ink temperature is preventing the ink from becoming airborne. As the temperature of the ink rises, the ink drawn by the fountain roller and transferred between the various rollers has a greater tendency to become airborne (e.g., as ink mist or droplets). This results not only in lost ink, but may cause additional problems for machine and plant maintenance if the airborne ink particles are not properly captured.

Ideally, a temperature control system should minimize the amount of time the temperature of the ink is outside of a desired range. Ideally, a temperature control system should create large temperature differentials between the ink temperature and a heating/cooling solution to quickly return the ink temperature to acceptable levels.

Further, a temperature control system should be configured so as to maximize available floor space adjacent the decorator, and allow for remote location of components where possible.

There is also a need for a dead-end flow system to deliver predetermined amounts of heating or cooling solution to a decorator based upon one or both of the ink temperature and the operating speed of the decorator, to avoid overheating or overcooling of the ink.

It would therefore be desirable to provide a system and/or method that provides one or more of these or other advantageous features or addresses one or more of the above-identified needs. Other features or advantages will be made apparent from the present specification. The teachings disclosed extend to those embodiments that fall within the scope of the appended claims, regardless of whether they accomplish one or more of the above-identified needs.

SUMMARY OF THE INVENTION

The invention relates to a decorator temperature control system having a recirculation loop configured to recirculate a solution and a feeder line configured to receive the solution from the recirculation loop and deliver the solution to at least one ink roller on a decorator. A feed valve is located between the recirculation loop and the feeder line and proximate the decorator and is configured to control the flow of the solution from the recirculation loop to the feeder line. The feed valve is configured to be controlled from a location remote from the decorator.

The invention further relates to a decorator having a plurality of ink rollers configured to distribute an ink at an ink temperature, a heating solution feed loop having a heating solution at a temperature substantially greater than the ink temperature, and a cooling solution feed loop having a cooling solution at a temperature substantially less than the ink temperature. A solution feeder line is configured to provide one of the heating solution and the cooling solution to the plurality of ink rollers based on the ink temperature.

The invention further relates to a method for controlling the temperature of an ink used in a decorator. The method includes the steps of providing a solution recirculation feed loop, at least a portion of the feed loop being proximate the decorator, monitoring the temperature of an ink on the surface of at least one ink roller of the decorator, and allowing the solution to flow from the portion of the recirculation feed loop proximate the decorator through the at least one ink roller if the temperature of the ink is outside of an acceptable range of temperatures.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
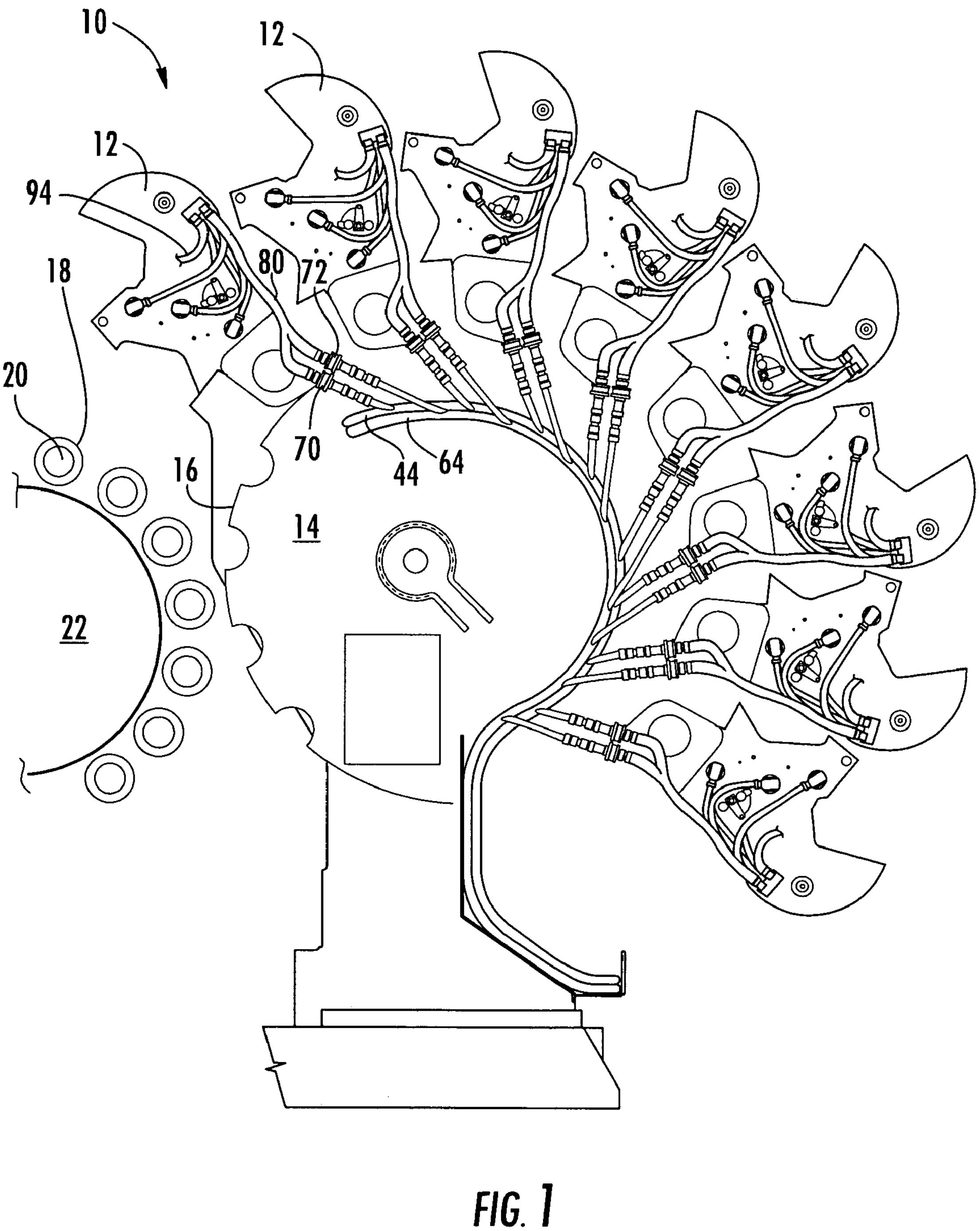
FIG. 1 is an elevation view of a portion of a temperature control system attached to a decorator.

Referring to FIG. 1, an exemplary embodiment of a decorator temperature control system is shown. Decorator 10 includes a number of inkers 12 arranged around the peripheral of a blanket wheel 14. Blanket wheel 14 has a number of inking or printing blankets 16 equally spaced about the circumference of blanket wheel 14. Blanket wheel 14 is rotated such that printing blankets 16 receive an ink image from one or more of inkers 12 and subsequently imprint the complete ink image upon a can 18. Can 18 is held by a mandrel 20, which is in turn mounted to a mandrel wheel 22 spinning in the opposite direction of blanket wheel 14.

Figure 2:
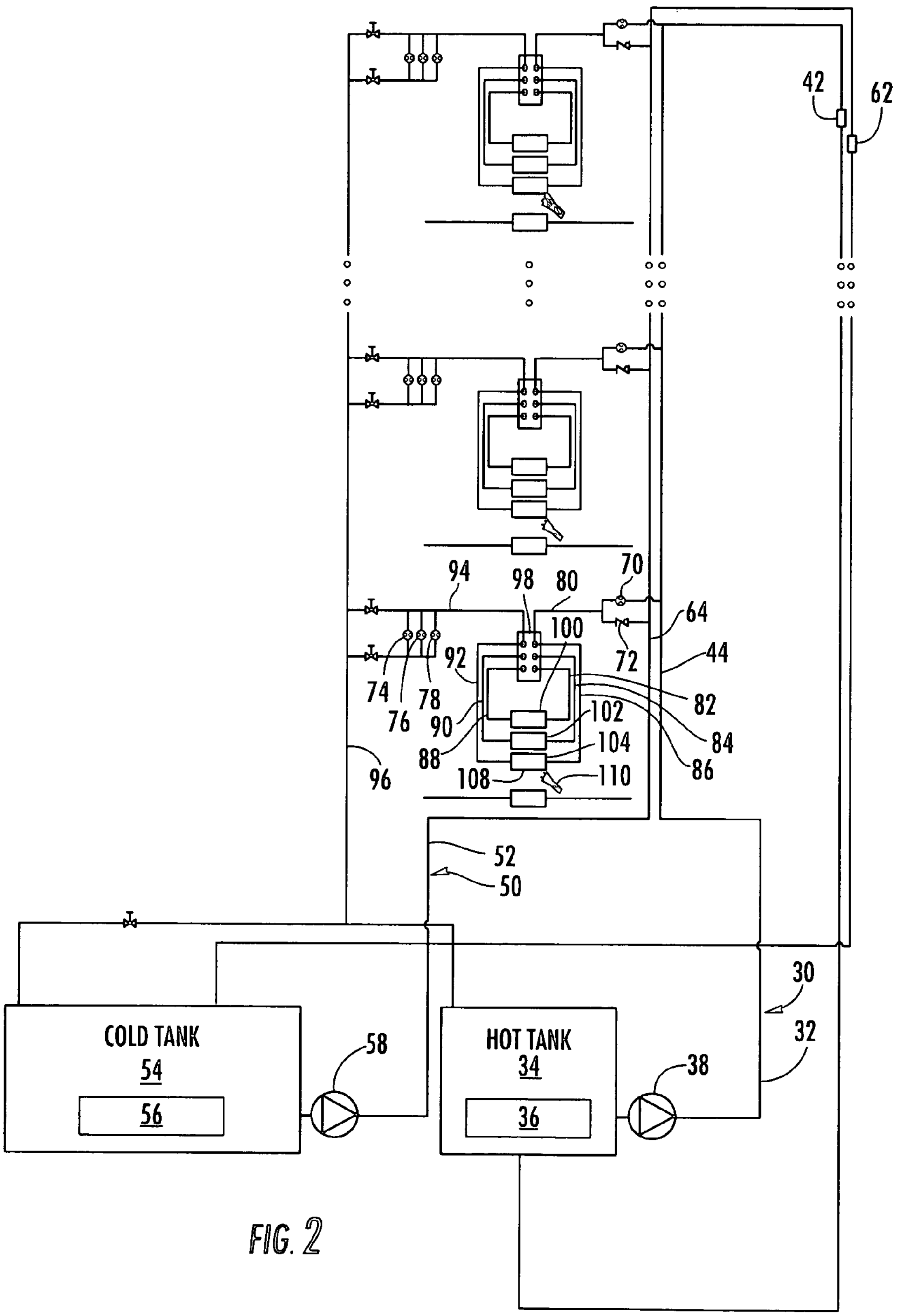
FIG. 2 is a schematic view of a temperature control system.

Referring to FIG. 2, the temperature control system includes two continuous feed loops. A hot feed loop 30 provides a continuous supply of a hot solution (not shown) to decorator 10. A cold feed loop 50 provides a continuous supply of cold solution (not shown) to decorator 10. In a preferred embodiment, the solution is water.

Hot feed loop 30 includes a hot tank or reservoir 34. Tank 34 includes or is connected to a heating unit 36 that maintains the hot solution at a substantially constant temperature (e.g., 120° F.). A pump 38 draws hot solution from tank 34 and pumps it through a hot feed line 32. Pump 38 is a variable speed pump and is controlled by a variable frequency drive (not shown). The variable frequency drive controls the operation of pump 38 so as to maintain a substantially constant pressure throughout hot feed line 32 even while, as discussed below, solution is rerouted from feed line 32. Feed line 32 carries the hot solution to decorator 10, where it is guided along each of inkers 12. As shown in FIGS. 1 and 2, feed line 32 includes a hot solution manifold 44 secured to decorator 10 and configured to distribute hot solution to the various inkers 12.

The hot solution not directed to inkers 12 returns to tank 34 along hot feed line 32. A flow restrictor 42 is located in line with hot feed line 32 and maintains the flow rate of the hot solution below a predetermined maximum rate (e.g., 3 gallons per minute (GPM)). As can be seen in FIGS. 1 and 2, hot feed loop 30 is a recirculation loop that continuously circulates hot solution through feed line 32 to manifold 44 and back to tank 34 at substantially constant pressure (e.g., 85 pounds per square inch (PSI)) and temperature (e.g., 120° F.) values.

Cold feed loop 50 is configured similarly to hot feed loop 30, and includes cold feed line 52, cold tank or reservoir 54, and cooling unit 56. Additionally, cold feed loop 50 includes pump 58, a variable frequency drive (not shown), flow restrictor 62, and cold solution manifold 64. The components of the cold feed loop serve the same general purposes as the similar components disclosed herein with respect to hot feed loop 30. As shown in FIGS. 1 and 2, cold feed loop 50 is a recirculation loop that continuously circulates cold solution through feed line 52 to manifold 64 and back to tank 54 at substantially constant pressure (e.g., 60 PSI) and temperature (e.g., 50° F.) values.

Hot feed loop 30 is capable of supplying hot solution to one or more of inker feed lines 80 via hot feed valves, shown as hot feed valves 70. As shown in FIGS. 1 and 2, when both cold and hot feed loops are used to supply solution to decorator 10, hot feed valve 70 is a stop valve (e.g., a solenoid valve), which as discussed further below, may be controlled remotely by a computer controller (e.g., a programmable logic controller (PLC), such as PLC 160 shown in FIG. 6). Similarly, cold feed loop 50 is capable of supplying cold solution to one or more of inker feed lines 80 via cold feed valves, shown as cold feed valves 72. Feed valve 72 is a check valve that prevents solution from flowing back into cold feed line 52 from inker feed line 80. In a preferred embodiment, hot feed valves 70 and cold feed valves 72 are located proximate inkers 12, and therefore decorator 10, such that each of valves 70, 72 are within 3 feet of decorator 10.

Figure 3:
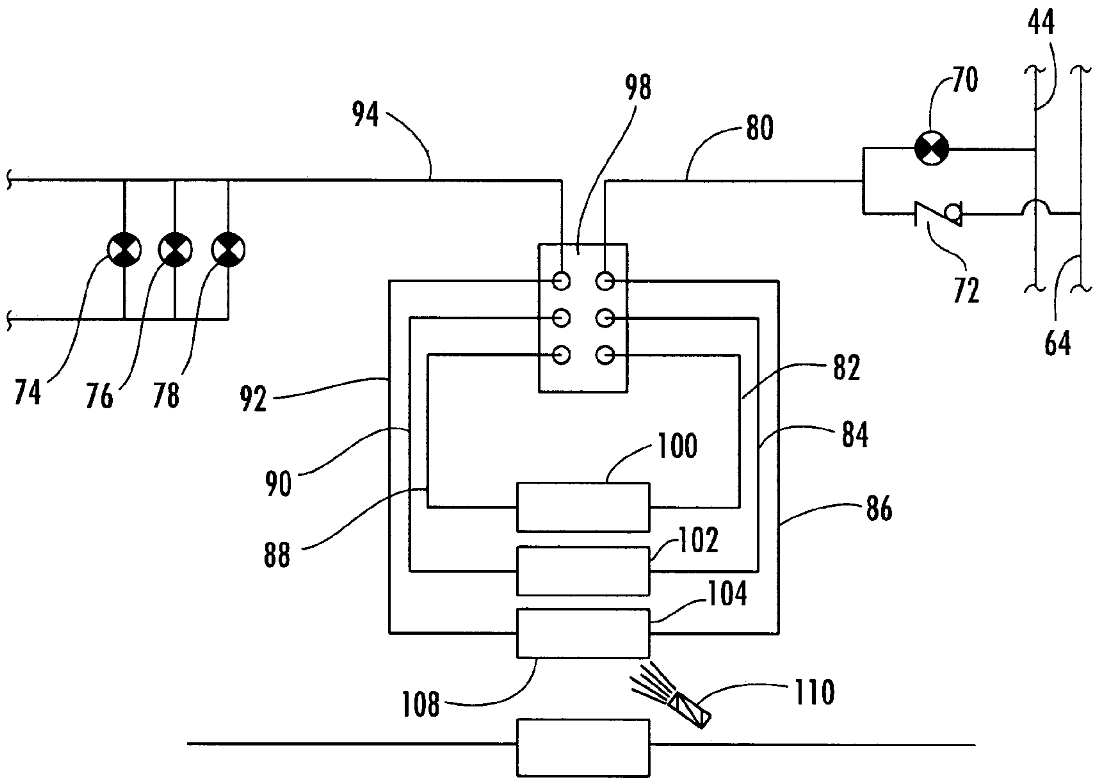
FIG. 3 is a partial schematic view of the temperature control system of FIG. 2.
Figure 4:
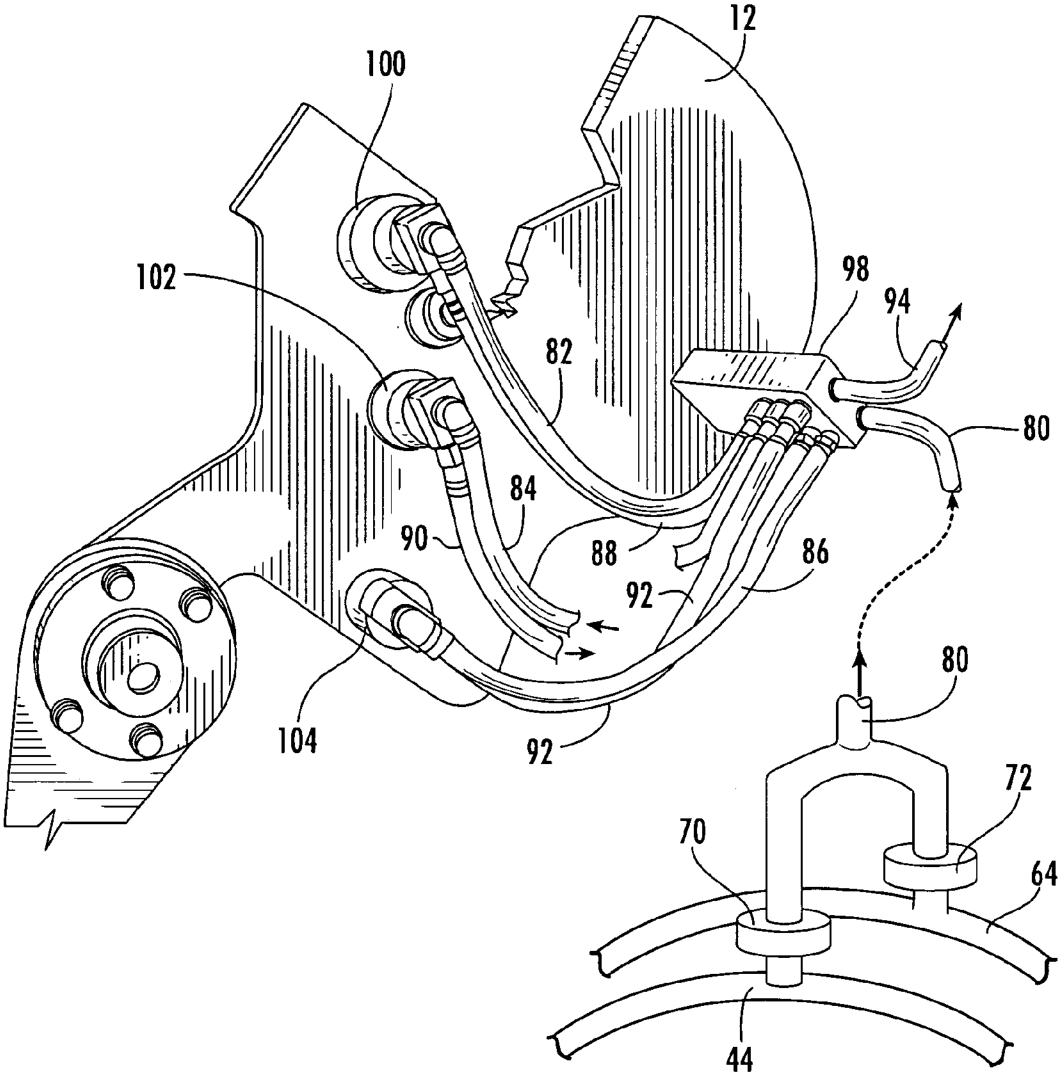
FIG. 4 is a partial perspective view of the temperature control system of FIG. 1.

Referring to FIGS. 3 and 4, once the solution (hot or cold) passes through either hot feed valve 70 or cold feed valve 72, it enters inker feed line 80. Inker feed line 80 is connected to a header or distribution box 98. In the embodiment shown in FIGS. 3 and 4, distribution box 98 is secured to a side of inker 12. Alternatively, distribution box 98 may be secured at any suitable location adjacent inker 12. Distribution box 98 serves to direct the solution to roller feed lines 82, 84, and 86, and back from roller return lines 88, 90, and 92. The solution enters distribution box 98 and is channeled to roller feed lines 82, 84, and 86. As shown in the embodiments described herein, three roller feeder lines, rollers, and roller return lines are utilized. Alternatively, fewer or more of each component may be utilized depending on the decorator, the cooling requirements, and other factors. Roller feed lines 82, 84, and 86 direct the solution to the interior of ink rollers 100, 102, and 104.

Rollers 100, 102, and 104 are inker rollers that facilitate the distribution and transfer of an ink 108 from an ink supply or tray (not shown) to printing blanket 16 on blanket wheel 14 (see FIGS. 1 and 2 ). A non-contact sensor (e.g., an infra-red temperature sensor) 110 monitors the temperature of ink 108 on the surface of one or more rollers 100, 102, and 104. Sensor 110 is coupled to PLC 160 (see FIG. 6) and provides input regarding the temperature of ink 108 as it passes over rollers 100, 102, and 104. By providing either a hot or cold solution to the interior of the rollers, a temperature differential is created between the rollers and the solution, and the temperature of the rollers (and thereby the ink) may be adjusted accordingly by controlling the flow of hot/cold solution. It should be noted that the preferred embodiments described herein utilize substantial temperature differentials between the hot/cold solutions and the ink of 30° F. or more, providing an advantage of many conventional systems that use much smaller temperature differentials and therefore correct deviations in ink temperature slower than the present invention. The actual temperature differentials used may be varied to suit the specific application and configuration of components.

In a preferred embodiment, because of the substantial temperature differentials that may be used in controlling the temperature of ink 108 on the surfaces of ink rollers 100, 102, and 104, the temperature of ink 108 as it passes over the fountain rollers (not shown) is controlled by a temperature control system distinct from the temperature control system described herein.

As shown in FIG. 4, the hot/cold solution enters and exits from the same side of rollers 100, 102, and 104. After the solution passes through the rollers, roller return lines 88, 90, and 92 direct the solution from the interior of rollers 100, 102, and 104 back to distribution box 98. Distribution box 98 then directs the solution to inker return line 94.

Figure 5:
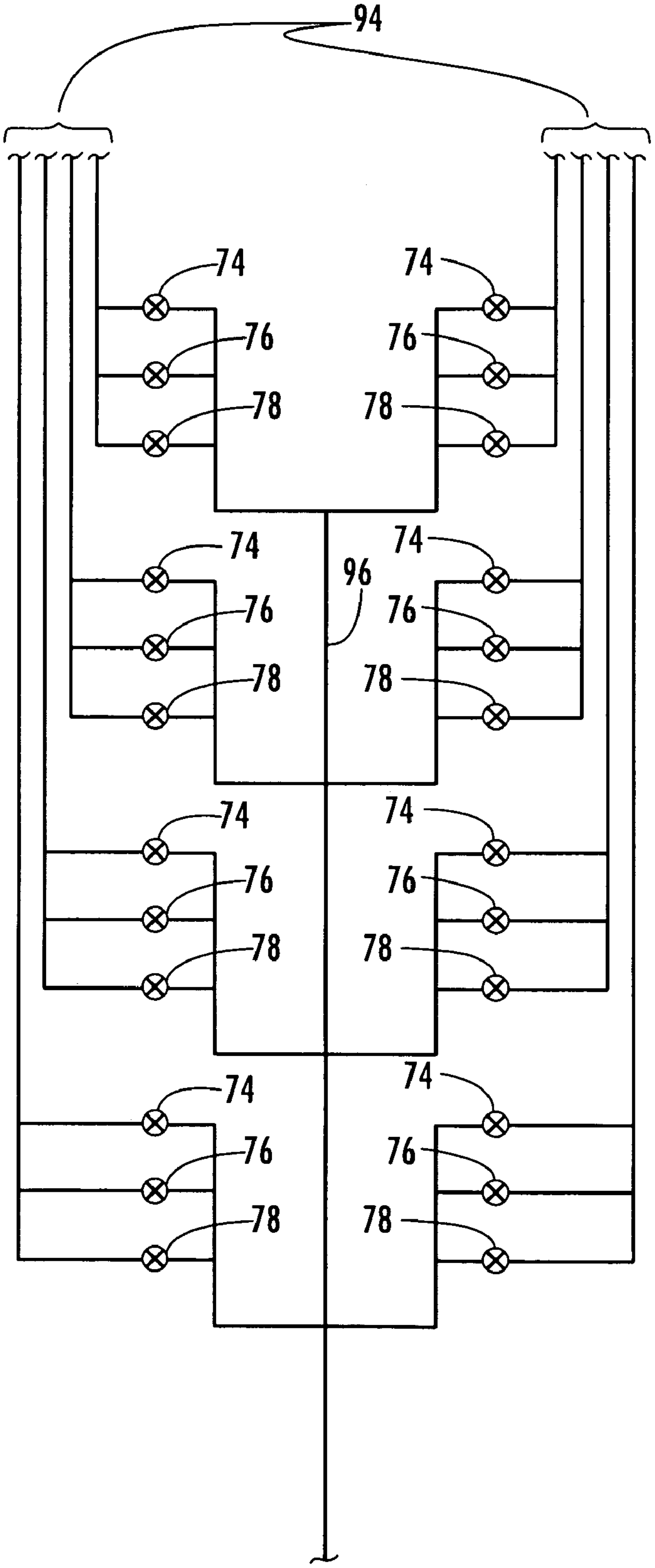
FIG. 5 is a schematic view of a group of return valves used in a temperature control system.

Referring to FIGS. 4 and 5, return valves, shown as return valves 74, 76, and 78, are positioned such that they control the flow of solution between the inker return line 94 and a main return line 96. As shown and described herein, return valves 74, 76, and 78 are stop valves (e.g., solenoid valves) and are arranged in parallel between inker return line 94 and main return line 96.

It should be noted that as schematically represented in FIGS. 1 and 3, return valves 74, 76, and 78 are located next to the respective inkers 12. As shown in FIG. 5, however, return valves 74, 76, and 78 may be located remotely from inkers 12 and decorator 10. For example, in an alternative embodiment, return valves 74, 76, and 78 may be located in a separate room from decorator 10, or be located 50 or more feet from decorator 10. This provides for additional usable space in the area immediately surrounding decorator 10, and allows flexibility in placement of return valves 74, 76, and 78. Additionally, locating return valves 74, 76, and 78 in a consolidated remote location such as that shown in FIG. 5 makes monitoring and maintenance of the system easier and more efficient.

One or more of return valves 74, 76, and 78 may be opened at any given time. Upon opening of one or more of the return valves, solution flows through rollers 100, 102, 104, and through the return valves and into the main return line 96. As discussed in further detail below, when one or more of return valves 74, 76, and 78 are open, hot solution flows through the rollers if valve 70 is also open, and cold solution flows through the rollers if valve 70 is closed. Main return line 96 then directs the solution back to one or both of hot and cold tanks 34, 54.

Further referring to FIGS. 1 and 2, the temperature control system is shown as having both a hot feed loop and a cold feed loop. In an alternative embodiment (not shown), the temperature control system may include only one of either a hot feed loop or a cold feed loop. The system would be substantially the same as that described with respect to FIGS. 1 and 2, except that only one of the hot and cold feed loops would be used, and only a single feeder valve (e.g., a check valve similar to cold feeder valve 72) would be required to regulate flow between the feeder loop and inker feed line 80. The remaining components would be similar to those used in the embodiments described with respect to FIGS. 1 and 2.

Figure 6:
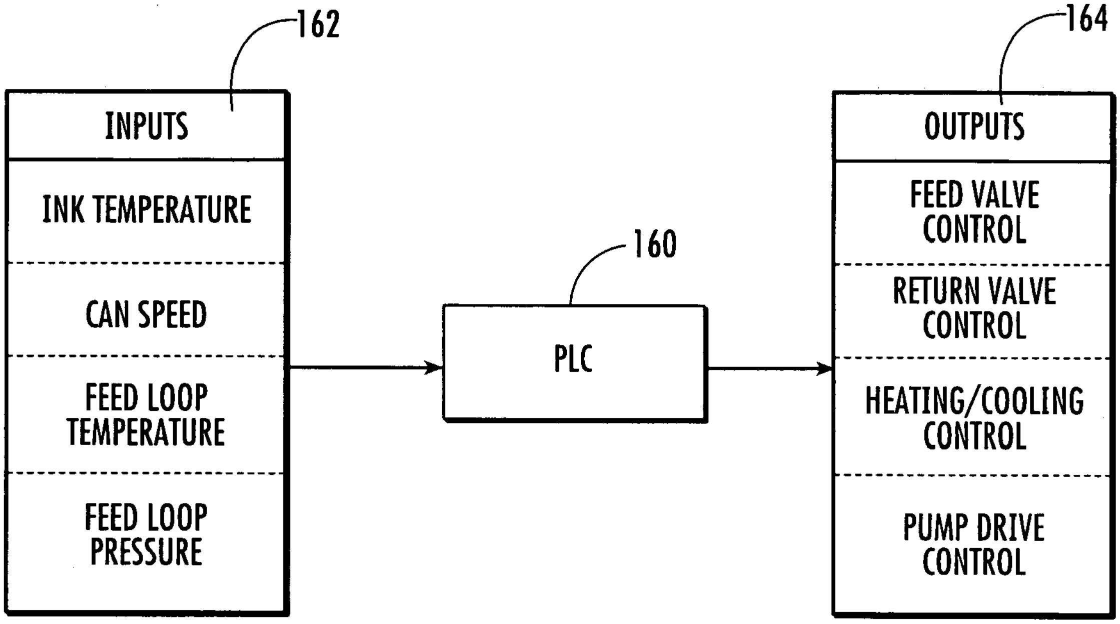
FIG. 6 is a flow diagram showing inputs and outputs to and from a programmable logic controller.

Referring to FIG. 6, the temperature control system additionally includes a computer control unit, or programmable logic controller (PLC) 160. PLC 160 receives various inputs 162 from decorator 10 and other components of the temperature control system. Inputs 162 may include, among others, a temperature of ink 108 from temperature sensor 110, a can speed from a speed sensor (not shown), and temperature and pressure data from locations along the various feed lines described herein. PLC 160 processes inputs 162 and generates outputs 164. Outputs 164 may include, among others, signals to hot feed valve 70 to open/close, signals to return valves 74, 76, and/or 78 to open/close, signals to frequency drives 40, 60 to vary the speed of pumps 38, 58, and signals to heating/cooling units 36, 56 to operate to maintain the temperature of the hot/cold solution at a predetermined temperature or within a predetermined range.

As with return valves 74, 76, and 78, PLC 160 may be remotely located from decorator 10, thereby preserving available floor space in the area adjacent to decorator 10, providing additional benefits over traditional systems that require the usage of substantial floor space adjacent the decorator.

The various temperature control systems described herein as exemplary embodiments of the invention may be utilized in the performance of temperature control procedures intended to provide greater control over ink temperature than conventional temperature control systems.

First, the various components of the temperature control system described herein are provided and properly installed on a decorator. It should be noted that the temperature control system described herein may be a retrofit system to be installed on an existing decorator. In an alternative embodiment, the invention incorporates a complete decorator system that includes the temperature control system of the present invention.

A hot feed solution is provided in hot feed loop 30. The hot solution is continuously circulated around hot feed line 32 by way of operation of pump 38. As discussed with respect to FIGS. 1-4, pump 38 is driven by a variable frequency drive intended to maintain the pressure within hot feed loop at a constant level (e.g., 85 PSI). The pressure of hot feed line 32 is 15-25 PSI greater than the pressure of cold feed line 52. The temperature of the hot solution is also maintained substantially constant (e.g., 120° F.) by way of operation of heating unit 36. Sensors are provided at one or more locations along hot feed line 32 and provide hot solution temperature and pressure data to PLC 160. PLC 160 may be remotely located from the decorator 10. PLC 160 receives the temperature and pressure data from the sensors along hot feed line 32 and controls the operation of pump 38 and heating unit 36 so as to maintain the temperature and pressure of hot feed line 32 at the predetermined levels. Flow restrictor 42 also constrains the flow rate of the hot solution below a set maximum (e.g., 3 GPM).

A cold feed solution is provided in cold feed loop 50. The cold solution is continuously circulated around cold feed line 52 by operation of pump 58. As discussed with respect to FIGS. 1-4, pump 58 is driven by a variable frequency drive intended to maintain the pressure within the cold feed loop at a constant level (e.g., 60 PSI). The temperature of the cold solution is also maintained substantially constant (e.g., 50° F.) by operation of cooling unit 56. Sensors are provided at one or more locations along cold feed line 52 and provide cold solution temperature and pressure data to PLC 160. PLC 160 may be remotely located from the decorator. PLC 160 receives the temperature and pressure data from the sensors along cold feed line 52 and controls the operation of pump 58 and cooling unit 56 so as to maintain the temperature and pressure of cold feed line 52 within the predetermined ranges. A flow restrictor also constrains the flow rate of the cold solution below a set maximum rate (e.g., 3 GPM).

As each of hot feed loop 30 and cold feed loop 50 are recirculating hot/cold solution, sensor 110 is monitoring the temperature of ink 108 as it passes over rollers 100, 102, and 104. Ink temperature data is sent from sensor 110 to PLC 160. PLC 160 is programmed to maintain the temperature of ink 108 on rollers 100, 102, and 104 within a range of a predetermined temperature (e.g., 90° F.). If the temperature of ink 108 is outside of the acceptable range of temperatures, PLC 160 directs hot feed valve 70 and/or return valves 74, 76, and 78 to actuate accordingly to provide a predetermined amount of either hot or cold solution to rollers 100, 102, and 104 in order to either heat or cool rollers 100, 102, and 104 and in turn, ink 108. The proper amount of solution to be delivered is determined by taking into account, among other factors, the current ink temperature, the desired ink temperature, the solution temperature, and the heat transfer characteristics of the various components involved. As discussed in further detail below, when one or more of return valves 74, 76, and 78 is opened, whether hot solution or cold solution flows through the rollers depends on whether hot feed valve 70 is open or closed. Hot solution flows to the rollers when valve 70 is open, and cold solution flows to the rollers when valve 70 is closed.

If the temperature of ink 108 is above the acceptable range of temperatures, the temperature control system provides a predetermined amount of cooling solution to the rollers. Depending on the temperature of ink 108, PLC 160 opens one or more of return valves 74, 76, and 78, which are normally closed. As the return valves open, the pressure in cold feed line 52 forces cold solution through cold feed valve 72 (e.g., a check valve). Hot feed valve 70 remains closed and prevents hot solution from flowing through rollers 100, 102, and 104 when cooling of the ink is desired. The cold solution that passes through cold feed valve 72 flows through inker feed line 80 to distribution box 98. Distribution box 98 directs the cold solution through roller feed lines 82, 84, and 86, which feed rollers 100, 102, and 104, respectively.

The cold solution flows through rollers 100, 102, and 104, creating a temperature differential between the cold solution and the interior of the rollers. Heat is transferred from the rollers to the cold solution, thereby cooling the rollers and, in turn, lowering the temperature of ink 108. After flowing through rollers 100, 102, and 104, the cold solution flows through roller return lines 88, 90, and 92 back to distribution box 98. Distribution box directs the cold solution to inker return line 94. From inker return line 94, the cold solution flows through one or more of return valves 74, 76, and 78, and to main return line 96. Main return line 96 returns the cold solution to one or both of hot tank 34 or cold tank 54.

PLC 160 concurrently controls the variable frequency drive connected to pump 58 so as to maintain a constant pressure within cold feed line 52 as cold solution is forced through cold feed valve 72. After the proper amount of cold solution has been directed through cold feed valve 72, return valves 74, 76, and 78 are returned to the closed position, creating a dead-end for the cold solution and preventing additional cold solution from flowing to rollers 100, 102, and 104. It should be noted that unlike traditional roller heating/cooling systems, the present invention utilizes a dead-end system to feed the rollers, where cold solution does not constantly flow through rollers 100, 102, and 104. This avoids common problems of over-heating/cooling of ink that occur when solution is constantly flowing through the rollers regardless of whether the ink is at an acceptable temperature.

If the temperature of ink 108 is below the acceptable range of temperatures, the temperature control system provides a predetermined amount of hot solution to the rollers. Upon detecting a need for hot solution, PLC 160 actuates hot feed valve 70 to the open position from the normally closed position. Depending on the temperature of ink 108, PLC 160 then opens one or more of return valves 74, 76, and 78, which are normally closed. As the return valves open, the pressure in hot feed line 52 forces hot solution through hot feed valve 70. Because hot feed line 32 is maintained at a constant pressure that is typically 15-25 PSI greater than the pressure of cold feed line 52, the higher pressure hot solution prevents cold solution from flowing through cold feed valve 72 upon opening of hot feed valve 70. The hot solution that passes through hot feed valve 70 flows through inker feed line 80 to distribution box 98. Distribution box 98 directs the hot solution through roller feed lines 82, 84, and 86, which feed rollers 100, 102, and 104, respectively.

The hot solution flows through the interiors of rollers 100, 102, and 104, creating a substantial temperature differential between the hot solution and the interior of the rollers. Heat is transferred from the hot solution to the rollers, thereby heating the rollers, and in turn, raising the temperature of ink 108. After flowing through rollers 100, 102, and 104, the hot solution flows through roller return lines 88, 90, and 92 back to distribution box 98. Distribution box 98 directs the hot solution to inker return line 94. From inker return line 94, the hot solution flows through one or more of return valves 74, 76, and 78, and to main return line 96. Main return line 96 returns the hot solution to one or both of hot tank 34 or cold tank 54.

PLC 160 concurrently controls the variable frequency drive connected to pump 38 so as to maintain a constant pressure within hot feed line 32 as hot solution is forced through hot feed valve 70. Maintaining the pressure of hot feed line 32 prevents cold solution from flowing through cold feed valve 72 upon opening feed valve 70 and one or more of return valves 74, 76, and 78. After the proper amount of hot solution has been directed through hot feed valve 70, return valves 74, 76, and 78 are returned to the closed position, creating a dead-end for the hot solution and preventing additional hot solution from flowing to rollers 100, 102, and 104. Hot feed valve 70 is then also closed. It should be noted that unlike traditional ink heating/cooling systems, the present invention utilizes a dead-end system to feed the rollers, where solution does not constantly flow past rollers 100, 102, and 104.

In an alternative embodiment, a can speed sensor (not shown) is provided on decorator 10. Because the ink temperature varies with can speed and the operating speed of the decorator, monitoring can speed (or anticipating can speed) provides a proactive approach to controlling ink temperature. The can speed sensor provides can speed data to PLC 160, which then incorporates the can speed data into its calculations of the appropriate controls of the temperature control system. For example, if an increase in can speed is anticipated, PLC 160 may be able to anticipate a future increase in ink temperature and provide the appropriate amount of cold solution to rollers 100, 102, and 104 sooner than if only ink temperature is monitored. This provides an additional advantage over traditional cooling systems that rely purely on historical temperature data in controlling cooling systems.

In yet another embodiment of the methods described herein, only one recirculation loop is utilized, being either a cold or hot feed loop. The system would then require only one feed valve (e.g., a check valve) in place of the separate hot/cold feed valves 70, 72. The operation of the system would otherwise be similar to that utilizing both hot feed loop 30 and cold feed loop 50, with the flow of solution being controlled by actuation of the return valves (e.g., return valves 74, 76, and 78).

While the detailed drawings and specific examples given herein describe various exemplary embodiments, they serve the purpose of illustration only. It is to be understood that the invention is not limited in its application to the details of construction and arrangements of components set forth in the preceding description or illustrated in the drawings. It should be noted that the components and/or assemblies of the temperature control system may be constructed from various materials known in the art. Further, while several examples show the invention in the context of can decorators, the invention is applicable to other printing devices and apparatuses not described in the embodiments contained herein. Further, the order of performance of the method steps described with respect to temperature control procedures utilizing the various embodiments of the present invention may vary. Furthermore, other substitutions, modifications, changes and omissions may be made in the design, operating conditions, and arrangements of the exemplary embodiments without departing from the scope of the invention as expressed in the appended claims.

What is claimed is:

1. A decorator temperature control system, comprising:

a recirculation loop configured to recirculate a solution;

a feeder line configured to receive the solution from the recirculation loop and deliver the solution to at least one ink roller on a decorator;

a feed valve located between the recirculation loop and the feeder line, the feed valve being proximate the decorator and configured to control the flow of the solution from the recirculation loop to the feeder line; and a speed sensor configured to measure the operating speed of the decorator;

wherein the feed valve is configured to be controlled from a location remote from the decorator based upon the operating speed.

2. The system of claim 1, further comprising a temperature sensor for measuring the temperature of an ink on the at least one ink roller.

3. The system of claim 2, wherein the feed valve is controlled based upon at least the temperature of the ink.

4. The system of claim 2, wherein the solution temperature is substantially greater than the temperature of the ink.

5. The system of claim 2, wherein the solution temperature is substantially less than the temperature of the ink.

6. The system of claim 1, wherein the solution in the recirculation loop is maintained at a substantially constant temperature and a substantially constant pressure.

7. The system of claim 1, further comprising a flow control device configured to control the flow of the solution exiting the at least one ink roller.

8. The system of claim 7, wherein the flow control device includes a plurality of return valves.

9. The system of claim 8, wherein the plurality of return valves are arranged in parallel.

10. The system of claim 9, wherein the plurality of return valves are located at a location remote from the decorator.

11. The system of claim 10, wherein the feed valve and the return valves are controlled by a computer.

12. The system of claim 1, further comprising a computer, wherein the computer controls the feed valve.

13. A decorator, comprising:

a plurality of ink rollers configured to distribute an ink at an ink temperature;

a heating solution feed loop having a heating solution at a temperature substantially greater than the ink temperature;

a cooling solution feed loop having a cooling solution at a temperature substantially less than the ink temperature;

a solution feeder line configured to provide one of the heating solution and the cooling solution to the plurality of ink rollers based on the ink temperature; and at least one variable speed pump that maintains a pressure differential between the heating solution feed loop and the cooling solution feed loop.

14. The decorator of claim 13, wherein the temperature of the heating solution is at least 120 degrees Fahrenheit and the temperature of the cooling solution is at most 60 degrees Fahrenheit.

15. The decorator of claim 13, wherein the at least one variable speed pump is controlled by a variable frequency drive.

16. The decorator of claim 15, wherein the pressure differential is at least 15 pounds per square inch.

17. The decorator of claim 13, further comprising an ink temperature sensor.

18. The decorator of claim 17, wherein the ink temperature sensor is a non-contact sensor.

19. The decorator of claim 13, wherein each roller has an entrance and an exit wherein the solution flowing from the exit is controlled by a valve system.

20. The decorator of claim 19, wherein the valve system is located at a location remote from the decorator.

21. The decorator of claim 20, wherein the valve system is controlled by a computer.

22. The decorator of claim 21, wherein the computer controls the valve system based on the ink temperature.

23. The decorator of claim 22, wherein the computer controls the valve system based further on an operating speed of the decorator.

24. A method for controlling the temperature of an ink used in a decorator, comprising:

providing a solution recirculation feed loop, at least a portion of the feed loop being proximate the decorator;

monitoring the temperature of an ink on the surface of at least one ink roller of the decorator; and allowing the solution to flow from the portion of the recirculation feed loop proximate the decorator through the at least one ink roller only if the temperature of the ink is outside of an acceptable range of temperatures;

providing at least one valve, wherein allowing the solution to flow comprises opening the at least one valve; and providing a computer configured to:

receive data related to the temperature of the ink;

determine a delivery time and a delivery period for delivery of the solution to the at least one inker; and control the at least one valve to deliver the solution to the at least one roller at the delivery time and for the delivery period.

25. The method of claim 24, wherein the at least one valve includes a plurality of valves located remotely from the decorator.

26. The method of claim 25, wherein the computer is located remotely from the decorator.

27. The method of claim 24, further comprising:

monitoring an expected future operating speed of the decorator;

predicting a future point in time for a change in ink temperature based on the expected future operating speed of the decorator;

allowing solution to flow to the at least one inker at a time prior to the future point in time.

* * * * *